(12) United States Patent
Miyata

(10) Patent No.: US 9,147,994 B2
(45) Date of Patent: Sep. 29, 2015

(54) GAS LASER SYSTEM CAPABLE OF MAINTAINING LASER GAS STATE DURING POWER SUPPLY CUTOFF

(71) Applicant: FANUC CORPORATION, Minamitsuru-gun, Yamanashi (JP)

(72) Inventor: Ryusuke Miyata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/590,369

(22) Filed: Jan. 6, 2015

(65) Prior Publication Data

US 2015/0214691 A1    Jul. 30, 2015

(30) Foreign Application Priority Data

Jan. 24, 2014   (JP) .................................. 2014-011357

(51) Int. Cl.
*H01S 3/13*     (2006.01)
*H01S 3/097*    (2006.01)

(52) U.S. Cl.
CPC .................................. *H01S 3/09702* (2013.01)

(58) Field of Classification Search
USPC ......................... 372/29.012, 34, 38.04, 55–58
See application file for complete search history.

(56) References Cited

U.S. PATENT DOCUMENTS

| 2005/0058172 | A1* | 3/2005 | Paetzel et al. | .................... 372/55 |
| 2009/0116521 | A1* | 5/2009 | Ando et al. | ...................... 372/33 |
| 2011/0243177 | A1 | 10/2011 | Nishio | |

FOREIGN PATENT DOCUMENTS

| JP | 6412590 | 1/1989 |
| JP | 2737177 B | 5/1990 |
| JP | 0571663 | 3/1993 |
| JP | 05110183 | 4/1993 |
| JP | 09318796 | 12/1997 |
| JP | 2009117700 | 5/2009 |
| JP | 2009283278 | 12/2009 |
| JP | 2010067494 | 3/2010 |
| JP | 2011228624 | 11/2011 |

* cited by examiner

*Primary Examiner* — Dung Nguyen
(74) *Attorney, Agent, or Firm* — RatnerPrestia

(57) ABSTRACT

A gas laser system including: a laser oscillator; a power supply unit for supplying power to the laser oscillator; a power storage unit for storing the power supplied from the power supply unit; a power reduction detection unit for detecting a power reduction state where a value of the power supplied from the power supply unit falls below a power value enabling the laser oscillator to normally operate; and a control unit for controlling the gas supply and discharge unit by using the power stored in the power storage unit so as to seal the gas flow path, when the power reduction detection unit detects the power reduction state.

3 Claims, 2 Drawing Sheets

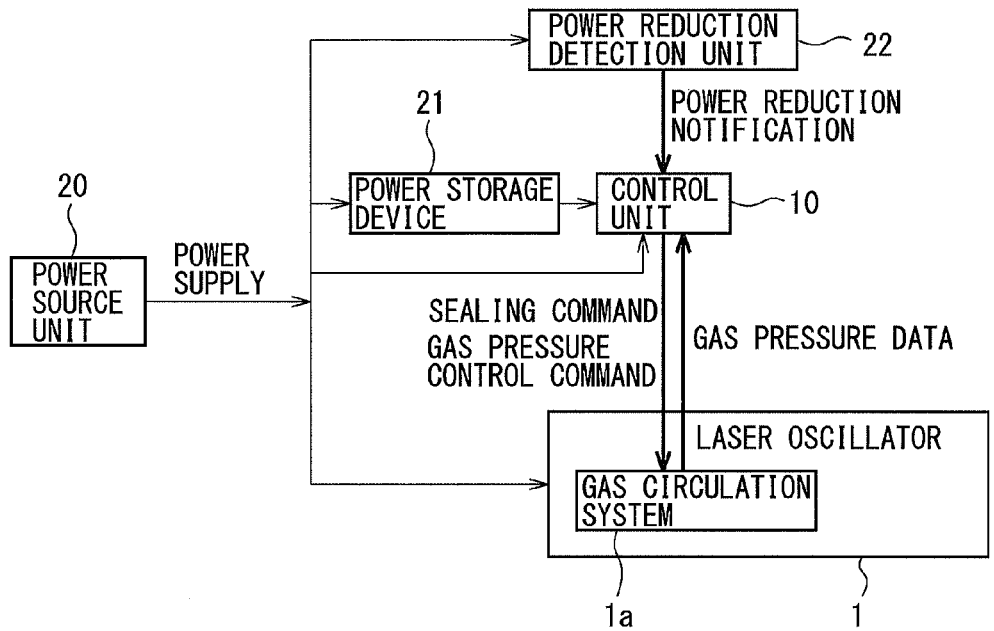
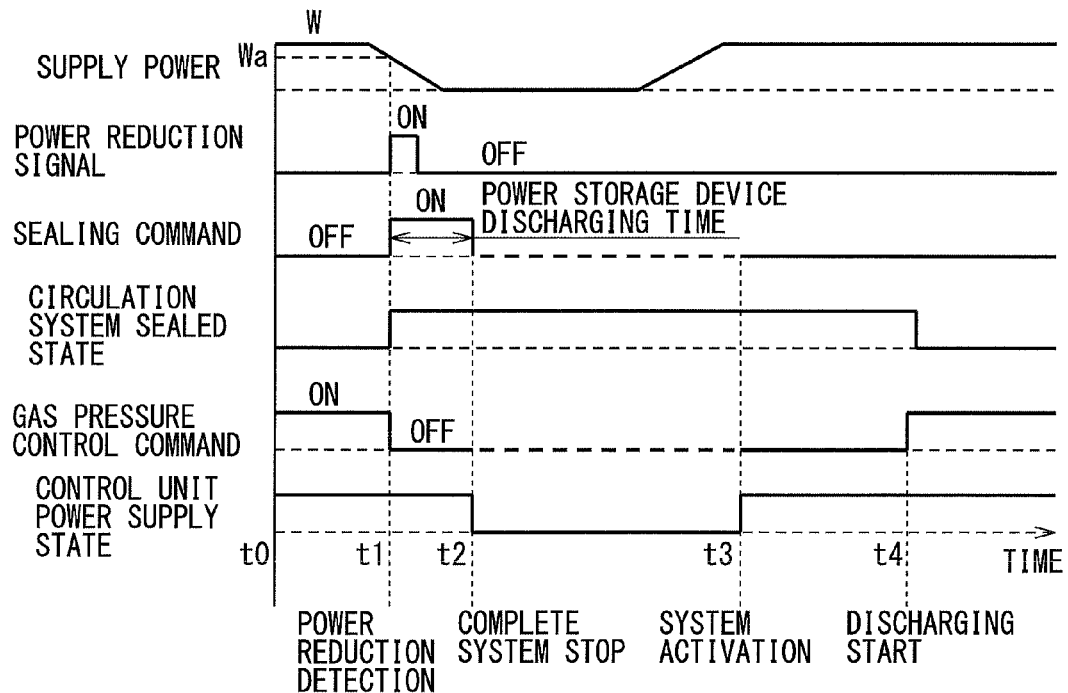

GAS LASER SYSTEM CAPABLE OF MAINTAINING LASER GAS STATE DURING POWER SUPPLY CUTOFF

BACKGROUND OF THE INVENTION

1. Field of the Invention

The present invention relates to a gas laser system capable of maintaining a laser gas state when a power failure or the like causes cutting-off of power supply.

2. Description of the Related Art

Generally, a gas laser oscillator is activated after laser gas in the laser oscillator is exchanged. Contrastingly, in order to shorten time for activating a laser oscillator, there is known an apparatus configured to omit a part of a laser gas exchanging process at the time of activation under certain conditions. This apparatus is described in, for example, Japanese Patent Publication No. 2737177 (JP2737177B). In the apparatus described in JP2737177B, when operation stop time of the laser oscillator is within predetermined time period or a gas temperature in the laser oscillator is equal to or higher than a predetermined temperature after a stop operation of the laser oscillator is performed, a part of the laser gas exchanging process is omitted.

However, in the apparatus described in JP2737177B, for example, when the power failure or the like causes cutting-off of the power, the stop operation of the laser oscillator may not be normally performed, and which may lead a difficulty of omission of a part of the laser gas exchanging process at the time of reactivation of the laser oscillator.

SUMMARY OF THE INVENTION

According to an aspect of the present invention, a gas laser system includes a laser oscillator including a gas flow path for circulating laser gas and a gas supply and discharge unit configured to supply laser gas to the gas flow path and discharge the laser gas from the gas flow path, a power supply unit configured to supply power to the laser oscillator, a power storage unit configured to store the power supplied from the power supply unit, a power reduction detection unit configured to detect a power reduction state where a value of the power supplied from the power supply unit falls below a value of a power enabling the laser oscillator to normally operate, and a control unit configured to control the gas supply and discharge unit by using the power stored in the power storage unit so as to seal the gas flow path, when the power reduction detection unit detects the power reduction state.

BRIEF DESCRIPTION OF THE DRAWINGS

The objects, features, and advantages of the present invention will become more apparent from the following description of the embodiments related to the accompanying drawings in which:

FIG. 2 is a block diagram illustrating a schematic configuration of the gas laser system according to the embodiment of the present invention; and FIG. 3 is a time chart illustrating a main operation of the gas laser system according to the embodiment of the present invention.

DETAILED DESCRIPTION

Figure 1:
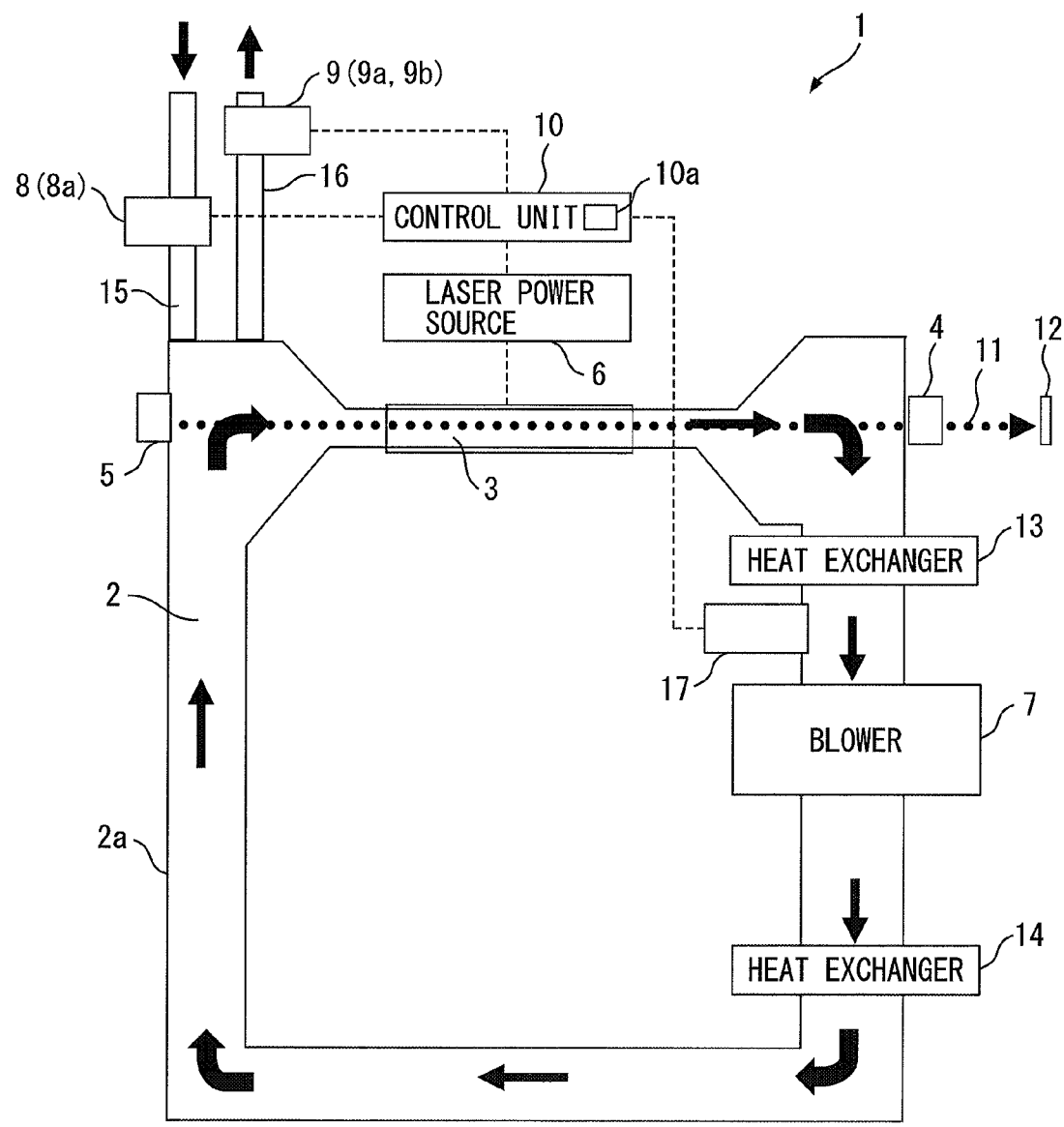
FIG. 1 is a diagram schematically illustrating a configuration of a laser oscillator constituting a gas laser system according to an embodiment of the present invention.

Hereinafter, an embodiment of the present invention will be described referring to FIGS. 1 to 3. FIG. 1 is a diagram schematically illustrating a configuration of a laser oscillator 1 constituting a gas laser system according to the embodiment of the present invention. The gas laser system according to the embodiment is applicable in a wide range of fields such as processing, medicine, and measurement.

As illustrated in FIG. 1, the laser oscillator 1 includes a gas flow path 2 for circulating laser gas, a discharge tube 3 communicated with the gas flow path 2, an output mirror 4 and a rear mirror 5 arranged at both sides of the discharge tube 3, a laser power source 6 for applying a voltage (discharge tube voltage) to the discharge tube 3, a blower 7 for circulating the laser gas along the gas flow path 2, a gas supply device 8 for supplying the laser gas to the gas flow path 2, and a gas discharge device 9 for discharging the laser gas from the flow path 2.

The gas flow path 2 is configured by using a laser gas container 2a. The laser gas container 2a is a sealed vacuum container, and the laser gas is enclosed in the laser gas container 2a in a state where the laser gas is isolated from the atmosphere. As the laser gas, medium gas for laser oscillation including a laser medium such as carbon dioxide, nitrogen gas, or argon is used.

The laser power source 6 is connected to a power source unit 20 of the gas laser system (FIG. 2) and power is supplied to the laser power source 6 from the power source unit 20. A control unit 10 controls power supplied from the laser power source 6 to the discharge tube 3. When the power is supplied from the laser power source 6 to the discharge tube 3, in other words, when a discharge tube voltage is applied, the laser gas is excited during passage through the discharge tube 3 to be a laser active state. Light generated through the discharge tube 3 is amplified between the output mirror 4 and the rear mirror 5, and a part of the light is output as a laser beam 11 from the output mirror 4. The laser beam 11 passes through an openable and closable shutter 12 and is irradiated on an object.

The blower 7 includes a fan or a blower driven by an electric motor. Power is supplied from the power source unit 20 (FIG. 2) to the blower 7 via a blower inverter not illustrated. The blower 7 is rotated by this power to circulate the laser gas along the gas flow path 2. A first heat exchanger 13 and a second heat exchanger 14 are respectively arranged on an upstream side and a downstream side of the blower 7 on the gas flow path 2. A predetermined refrigerant (for example, cooling water) is run through each of the heat exchangers 13 and 14. The laser gas is cooled during the passage through the heat exchangers 13 and 14 by the heat exchanging with the refrigerant and maintained at a predetermined temperature.

A gas supply flow path 15 and a gas discharge flow path 16 are each connected to the gas flow path 2. The gas supply device 8 is installed on the gas supply flow path 15, and the gas discharge device 9 is installed on the gas discharge flow path 16. The gas supply device 8 includes a gas supply valve 8a, and the gas discharge device 9 includes a gas discharge valve 9a and a vacuum pump 9b.

The gas supply valve 8a and the gas discharge valve 9a are on-off valves (solenoid valves) opened or closed by control signals from the control unit 10. In other words, the gas supply valve 8a and the gas discharge valve 9a include solenoids and springs, and are closed by spring forces in unexcited neutral states of the solenoids. On the other hand, when the solenoids receive power from the control unit 10 to be excited, the gas supply valve 8a and the gas discharge valve 9a are opened against the spring forces. In other words, the gas supply valve 8a and the gas discharge valve 9a are opened when the control unit 10 outputs an ON-signal thereto, and closed when the control unit 10 outputs an OFF-signal (sealing command) thereto. The gas supply valve 8a and the gas discharge valve 9a can be configured as proportional solenoid valves, valve opening degrees of which can be adjusted.

A high-pressure tank (not illustrated) storing the laser gas is connected to the gas supply flow path 15. Accordingly, when the gas supply valve 8a is opened, the laser gas is supplied from the tank to the gas flow path 2 via the gas supply valve 8a. On the other hand, when the gas discharge valve 9a is opened and the vacuum pump 9b is driven, the laser gas is discharged from the gas flow path 2 via the gas discharge valve 9a. When the gas supply valve 8a and the gas discharge valve 9a are closed, the gas flow path 2 is set in a sealed state.

During laser oscillation, the laser gas is supplied to and discharged from the gas flow path 2 via the gas supply flow path 15 and the gas discharge flow path 16, respectively, and the laser gas in the laser gas container 2a is replaced by a small amount. A gas pressure detector 17 is installed on a downstream side of the first heat exchanger 13 and on the upstream side of the blower 7, and gas pressure in the laser gas container 2a is detected by the gas pressure detector 17. The control unit 10 outputs a control signal (gas pressure control command) to the blower 7, the gas supply device 8, and the gas discharge device 9 based on a detection value of the gas pressure detector 17, to control the gas pressure in the laser gas container 2a to predetermined gas pressure.

When activation of the laser oscillator 1 above configured is instructed, the laser oscillator 1 performs in advance a predetermined preparatory operation in response to a command from the control unit 10, and then starts a discharging operation. The preparatory operation includes, for example, a step of discharging the gas from the laser gas container 2a by the gas discharge device 9, and a step of supplying, after the gas discharging step, laser gas of predetermined pressure into the laser gas container 2a by the gas supply device 8. The gas in the laser gas container 2a is replaced through the preparatory operation. The gas supplying step may be started before completion of the gas discharging step.

When an operation of the laser oscillator 1 is normally stopped after the end of discharging, the oscillator 1 performs a predetermined normal stop operation in response to a command from the control unit 10. The normal stop operation includes a step of closing the gas supply valve 8a of the gas supply device 8 and the gas discharge valve 9a of the gas discharge device 9, and a step of stopping driving of the vacuum pump 9b and the blower 7. Then, the operation is ended in a state where the laser gas container 2a is filled with laser gas of pressure higher than atmospheric pressure. As a result, incursion of the atmosphere into the gas flow path 2 is prevented after the operation of the laser oscillator 1 is stopped.

The control unit 10 includes an abnormality detection unit 10a configured to detect abnormality of the operation of the laser oscillator 1. After detection of operation abnormality by the abnormality detection unit 10a, the operation of the laser oscillator 1 is forcibly stopped (alarm stop). In other words, the operation of the laser oscillator 1 is stopped by performing an abnormality stop operation. The abnormality detection unit 10a detects, for example, gas pressure or a temperature in the laser gas container 2a, a discharge state, or a driven state of the vacuum pump 9b or the blower 7 to determine presence or absence of operation abnormality of the laser oscillator 1. When operation abnormality is determined, the driving of the vacuum pump 9b and the blower 7 are stopped, and the gas supply valve 8a and the gas discharge valve 9a are opened. This causes the laser oscillator 1 to return to an initial state before the activation.

When the laser oscillator 1 is reactivated after the normal stop operation, the control unit 10 determines whether operation stop time period is within a predetermined time period. This is a determination of whether the laser gas in the laser gas container 2a is maintained in a predetermined state. In other words, when the operation stop time period is within the predetermined time period, the control unit 10 determines that there is no incursion of the atmosphere into the gas flow path 2 or no leakage of the laser gas from the gas flow path 2 and therefore the laser gas in the gas flow path 2 is maintained in the predetermined state.

In this case, a part of or all of the preparatory operation (for example, replacement of laser gas) is omitted to start discharging. This shortens time for activating the laser oscillator 1 to enable discharging to be resumed within a short time. As long as laser gas pressure in the laser gas container 2a can be determined to be maintained in a predetermined state, another parameter (for example, temperature or pressure of laser gas in the laser gas container 2a) may be used as a determination criteria instead of the operation stop time period.

When a power failure causes cutting-off of power during the operation of the laser oscillator 1 in, for example, a region where a power condition is not good, there is a possibility that the abnormality detection unit 10a may detect abnormality, and thereby disabling the normal stop operation of the laser oscillator 1. In this case, when the laser oscillator 1 is reactivated, the preparatory operation cannot be omitted, disabling resumption of the discharging within a short time. In order to prevent such a case, according to the embodiment, the gas laser system is configured as described below.

FIG. 2 is a block diagram illustrating a schematic configuration of the gas laser system according to the embodiment of the present invention. In the drawing, a gas circulation system 1a of the laser oscillator 1 includes components relating to circulation of the laser gas through the gas flow path 2, specifically, the blower 7, the gas supply device 8, the gas discharge device 9, and the gas pressure detector 17. FIG. 2 mainly illustrates a configuration relating to control of the gas circulation system 1a.

As illustrated in FIG. 2, the laser oscillator 1, the control unit 10, a power storage device 21, and a power reduction detection unit 22 are connected to the power source unit 20 of the gas laser system. The power storage device 21 is a battery having a predetermined capacity, and stores supply power from the power source unit 20. The power storage device 21 is connected to the control unit 10, and the control unit 10 can be operated by power supplied from the power storage device 21.

The power reduction detection unit 22 is configured by including a voltmeter, and detects a reduction state of the power supplied from the power source unit 20, in other words, detects that the supply power W becomes a predetermined value Wa or lower. The predetermined value Wa is equivalent to, for example, power at the time of occurrence of a power failure, and occurrence of a power failure or not is detected by the power reduction detection unit 22. In other words, the predetermined value Wa is a power level enabling a normal operation of the laser oscillator 1, and the power reduction detection unit 22 detects the reduction state of power where a power value falls below the power value Wa enabling the laser oscillator 1 to normally operate. The power reduction detection unit 22 is connected to the control unit 10, and the power reduction state detected by the power reduction detection unit 22 (power reduction signal) is notified to the control unit 10.

The control unit 10 outputs a control signal to the gas supply valve 8a and the gas discharge valve 9a of the gas circulation system 1a based on signals from the power reduction detection unit 22 and the gas pressure detector 17 of the gas circulation system 1a. In other words, when there is no power reduction signal output from the power reduction detection unit 22, the control unit 10 outputs a control signal (gas pressure control command) to the gas circulation system 1*a* based on gas pressure data detected by the gas pressure detector 17 to control gas pressure of the gas flow path 2 to a predetermined gas pressure. On the other hand, when there is a power reduction signal output from the power reduction detection unit 22, the control unit 10 stops outputting of the gas pressure control command, and outputs an OFF-signal (sealing command) to the gas supply valve 8*a* and the gas discharge valve 9*a* to close the gas supply valve 8*a* and the gas discharge valve 9*a*.

A main operation of the gas laser system according to the embodiment of the present invention will be described referring to a time chart of FIG. 3. At a point of time t0, the supply power W from the power supply unit 20 during the operation of the laser oscillator 1 is larger than the predetermined value Wa. Accordingly, the control unit 10 outputs (ON) a gas pressure control command to the gas circulation system 1*a* by using power from the power source unit 20. When a power failure occurs in this state, as illustrated in FIG. 3, the power W supplied from the power source unit 20 is reduced.

At a point of time t1, when the supply power W falls to the predetermined value Wa or lower, the power reduction detection unit 22 outputs (ON) a power reduction signal. At this time, power is supplied from the power storage device 21 to the control unit 10. The control unit 10 stops (OFF) outputting of the gas pressure control command, and outputs an OFF-signal to the gas supply valve 8*a* and the gas discharge valve 9*a* by using the power from the power storage device 21, in other words, causes a sealing command to be active. Thus, the gas supply valve 8*a* and the gas discharge valve 9*a* are closed to set the circulation system (gas flow path 2) in a sealed state.

The outputting of the sealing command is continued for a predetermined time from the point of time t1 to the point of time t2. The predetermined time is equivalent to discharging time of the power storage device 21. At the point of time t2, the power supply from the power storage device 21 to the control unit 10 is cut off and the gas laser system becomes a completely stopped state. Therefore, even when the abnormality detection unit 10*a* detects operation abnormality, no abnormality stop operation with opening of the gas supply valve 8*a* and the gas discharge valve 9*a* is performed due to the continued outputting of the sealing command for the predetermined time, and the gas flow path 2 can be maintained in the sealed state.

At the point of time t2, after the gas laser system is completely stopped, no sealing command is output, and the gas supply valve 8*a* and the gas discharge valve 9*a* are set in unexcited neutral states of the solenoids. Accordingly, the gas supply valve 8*a* and the gas discharge valve 9*a* are maintained closed, and the laser gas container 2 is maintained in the sealed state. By maintaining the sealed state of the gas flow path 2 during the power failure, a gas state of the gas flow path 2 at the time of reactivation of the gas laser system after restoration from the power failure at a point of time t3 is equal to that before the power failure. As a result, without any need to perform a preparatory operation all over again to activate the laser oscillator 1, discharging can be resumed at a point of time t4 immediately after the activation of the gas laser system.

The embodiment of the present invention can provide the following operation effects.

(1) The gas laser system includes the power source unit 20, the power storage device 21 for storing the power supplied from the power source unit 20, the power reduction detection unit 22 for detecting the reduction state of the power supplied from the power source unit 20, and the control unit 10 for controlling the opening/closing of the gas supply valve 8*a* and the gas discharge valve 9*a* of the laser oscillator 1. When the power reduction detection unit 22 detects the power reduction state, the control unit 10 outputs the sealing command to the gas supply valve 8*a* and the gas discharge valve 9*a* by using the power stored in the power storage device 21 to set the gas flow path 2 in the sealed state. Thereby, when the power supply is reduced due to the power failure or the like, the gas state in the laser gas container 2*a* at the point of time of the power supply reduction (point of time t1 in FIG. 3) is maintained even during the power failure. As a result, at the power recovery time (point of time t3 in FIG. 3), the replacing step of the laser gas in the laser oscillator 1 can be omitted, and discharging can be resumed within a short time.

(2) When the abnormality detection unit 10*a* detects the abnormality of the operation of the laser oscillator 1 while the power reduction detection unit 22 does not detect the reduction state of the power, the control unit 10 performs the abnormality stop operation to stop the driving of the vacuum pump 9*b* and the blower 7 and to open the gas supply valve 8*a* and the gas discharge valve 9*a*. On the other hand, the control unit 10 controls the gas supply valve 8*a* and the gas discharge valve 9*a* to seal the gas flow path 2 when the power reduction detection unit 22 detects the reduction state of the power even when the abnormality detection unit 10*a* detects the abnormality of the operation of the laser oscillator 1. As a result, during the power failure, the gas flow path 2 can be surely maintained in the sealed state without executing any alarm stop operation.

(3) The gas supply valve 8*a* and the gas discharge valve 9*a* are configured as the solenoid valves closed in the unexcited neutral states of the solenoids after the command from the control unit 10 is stopped. As a result, the power supply from the power storage device 21 to the control unit 10 is stopped, and the gas flow path 2 can be maintained in the sealed state even after the gas laser system is completely stopped.

According to the above embodiment, the power supplied from the power source unit 20 is stored in the power storage device 21. However, the power storage unit is not limited to this configuration. For example, power may be stored in a capacitor installed in the control unit 10. According to the above embodiment, the voltmeter is used for the power reduction detection unit 22 to detect the power reduction state where a power value becomes equal to or lower than the predetermined value Wa. However, the power reduction detection unit 22 is not limited to this configuration. According to the above embodiment, the reduction state of the power supply during the power failure is detected by the power reduction detection unit 22. However, the reduction state of the supply power occurs not only during the power failure but also, for example, when a main power source is manually turned OFF. Accordingly, the power reduction detection unit 22 can detect the reduction state of the power in this case, and thus the gas laser system according to the present invention can be applied to other cases in addition to the case of the power failure. According to the above embodiment, the power from the power source unit 20 is applied to the discharge tube 3 via the laser power source 6. However, the laser power source 6 may be included in the power source unit 20. In other words, the power source unit 20 serving as the main power source of the gas laser system is not limited to the above-mentioned configuration.

According to the embodiment, the laser gas is supplied to and discharged from the gas flow path 2 by the gas supply device 8 and the gas discharge device 9, respectively, the devices including the valve devices (gas supply valve 8*a* and gas discharge valve 9a) closed in the state where the command from the control unit 10 is stopped. However, the gas supply and discharge unit is not limited to this configuration. Any configuration can be employed for the gas flow path 2 through which the laser gas circulates, and the laser oscillator 1 is not limited to the above-mentioned configuration. Any configuration can be employed for the control unit 10 as long as the gas supply and discharge unit is controlled by using the power stored in the power storage unit so as to seal the gas flow path 2 when the power reduction detection unit 22 detects the reduction state of the power.

The embodiment can be arbitrarily combined with one or a plurality of modified examples.

According to the present invention, the gas supply and discharge unit is controlled by using the power stored in the power storage unit so as to seal the gas flow path when the power is reduced due to the power failure or the like. Thus, the laser gas state in the gas flow path before the power failure can be maintained even during the power failure. As a result, at the power recovery time, the replacing step of the laser gas can be omitted, and discharging can be resumed within a short time.

While the present invention has been described with reference to the preferred embodiment, as obvious to those skilled in the art, various corrections and changes can be made without departing from the disclosed scope of the clams described later.

The invention claimed is:

1. A gas laser system comprising:
a laser oscillator including a gas flow path for circulating laser gas, and a gas supply and discharge unit configured to supply laser gas to the gas flow path and discharge the laser gas from the gas flow path;
a power supply unit configured to supply power to the laser oscillator;
a power storage unit configured to store the power supplied from the power supply unit;
a power reduction detection unit configured to detect a power reduction state where a value of the power supplied from the power supply unit falls below a power value enabling the laser oscillator to normally operate; and
a control unit configured to control the gas supply and discharge unit by using the power stored in the power storage unit so as to seal the gas flow path, when the power reduction detection unit detects the power reduction state.

2. The gas laser system according to claim 1, further comprising
an abnormality detection unit configured to detect abnormality of an operation of the laser oscillator,
wherein the control unit performs a predetermined abnormality stop operation when the abnormality detection unit detects the abnormality of the operation of the laser oscillator while the power reduction detection unit does not detect the power reduction state, and controls the gas supply and discharge unit to seal the gas flow path when the power reduction detection unit detects the power reduction state even when the abnormality detection unit detects the abnormality of the operation of the laser oscillator.

3. The gas laser system according to claim 1, wherein the gas supply and discharge unit includes a valve device installed in a laser gas supply and discharge path communicated with the gas flow path and closed in a state where a command from the control unit is stopped.

* * * * *